US007107582B2

(12) United States Patent
Clarke et al.

(10) Patent No.: US 7,107,582 B2
(45) Date of Patent: Sep. 12, 2006

(54) SYSTEM AND METHOD FOR SOURCE-DRIVEN FORM-INDEPENDENT DYNAMIC CONTENT RESOLUTION

(75) Inventors: Edward Clarke, Ossining, NY (US); Yuan Feng, White Plains, NY (US); Robert Flavin, Yortown Heights, NY (US); Geoffrey H. Purdy, Roxbury, CT (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/003,957

(22) Filed: Nov. 15, 2001

(65) Prior Publication Data

US 2003/0093399 A1 May 15, 2003

(51) Int. Cl.
*G06F 9/44* (2006.01)
*G06F 9/45* (2006.01)
(52) U.S. Cl. ..................... 717/143; 717/114
(58) Field of Classification Search ............ 717/143, 717/114; 707/1, 10; 395/200
See application file for complete search history.

(56) References Cited

U.S. PATENT DOCUMENTS

| 4,562,529 A * | 12/1985 | Drummond .................. 700/12 |
| 5,193,180 A * | 3/1993 | Hastings ..................... 717/163 |
| 5,742,845 A * | 4/1998 | Wagner ....................... 710/11 |
| 5,812,436 A * | 9/1998 | Desgrousilliers et al. ... 702/108 |
| 5,835,712 A | 11/1998 | DuFresne |
| 5,940,834 A | 8/1999 | Pinard et al. |
| 5,983,227 A | 11/1999 | Nazem et al. |
| 6,256,032 B1 | 7/2001 | Hugh |
| 6,289,502 B1 * | 9/2001 | Garland et al. ............. 717/104 |
| 6,493,710 B1 * | 12/2002 | Gollapudi et al. ............. 707/4 |
| 6,501,950 B1 * | 12/2002 | Smith et al. ................. 455/423 |
| 6,766,298 B1 * | 7/2004 | Dodrill et al. ........... 704/270.1 |
| 6,820,135 B1 * | 11/2004 | Dingman et al. ........... 709/246 |
| 2002/0111965 A1 * | 8/2002 | Kutter ........................ 707/513 |

OTHER PUBLICATIONS

Date et al., "A Guide to SQL/DS", Addisson Wesley Publishing company, 1989 , ch2, pp. 21-34, ch8, pp. 131-142, Ch17, pp. 287-29 (39 pages).*
IBM, "INSERT statement", retrieved from <http://publib.boulder.ibm.com/infocenter/db2help/topic/co..>, SQL Reference, vol. 2.*
W3C, "Extensible markup Language (XML) 1.0", REC-xml-19980219, retrieve from <http://www.w3.org/XML/xml-19980210-errata>, Feb. 10, 1998.*

* cited by examiner

*Primary Examiner*—Wei Zhen
*Assistant Examiner*—Qamrun Nahar
(74) *Attorney, Agent, or Firm*—Steve Kaufmann Esq; Greenblum & Bernstein P.L.C.

(57) ABSTRACT

A computer system and method is presented for dynamic content resolution. The invention comprises one or more source program files and one or more insert statements inserted into the source program files. The insert statements having one or more logical condition statements with one or more logical parameters and one or more state statements. An insert statement parser determines a state of the condition statement, selects one of the state statements associated with the state, and parses the selected state statement into one or more content source indicators. A content source identification process uses one or more of the content source indicators to determine a content source type and one or more access instructions. A content source access process uses the access instructions to access a content source object. A content insertion process replaces the insert statement with the source object in the source program file.

19 Claims, 12 Drawing Sheets

| 300 | 305 content source objects | 210 content source indicators | 310 content source object information including type, access, retrieval instructions |
|---|---|---|---|
| | mass data storage application | DB PERSON FIRST_NAME | DLL SXDB OPENFN<br>DLL SXDB_PERSON SXDBFINDPERSON<br>DLL SXDB_PERSON SXDBQUERYFNFORPERSON |
| | HTML program source file | HTML DEFAULT_PERSON DEFAULT_NAME | INFILE PARENT c:\www\error.html<br>INFILE PARENT c:\www\default.html<br>INFILE PARENT c:\www\default.html |
| | static file | FILE | TXT c:\person_profile.txt |
| | memory access | TRANS PERSON | DLL MEM_ACCESS.C OPENFN<br>DLL MEM_ACCESS.C MEMB_LOCATE |
| | multimedia data file | MOVIE | MPEG-2 c:\work_env.mpg |

Fig. 3

| | |
|---|---|
| insert statement identifiers | "<" indicating the start and ">" indicating the end |
| order of parsing | Left to right |
| statement delimiter | blank, i.e. " " |
| content source indicator delimiter | period, i.e. "." |
| contnet source type indicator identifier | hyphen of "-" proceeding a content source indicator |
| nested content source indicator identifier | Proceded by left parenthesis, i.e. "(", and followed by right parenthesis, i.e. ")" |

Fig. 4

```
900
<html>
<title>User Profile</title>
<body <INSERT -BK_IMAGE.SKYEXBACKIMG -BK_IMAGE.DEFAULTBACKIMG -TRANS.SKYEX>>    ← 905
<table>
<tr>
<td rowspan=2>
<INSERT -IMAGE.SKYEXLOGO -MAGE.DEFAULTBACKIMG -TRANS.SKYEX>    ← 910
</td>
<td align=right>
<FONT color=#0000a0 size=+1> User Profile -- </FONT>
</td>
<td align=right>
<FONT color=#0000a0 size=+1>
<INSERT -TRANS.PERSON.COMPANY_NAME -HTML.DEFAULT_COMPANY_NAME -TRANS.USERIDCLAIMED>    ← 915
</FONT>
 ⋮
</table>
 ⋮
</body>
</html>
```

```
<html>
    <title>User Profile</title>                                  ←—— 1005
    <body background="image/back18.jpg">
    <table>
     <tr>
      <td rowspan=2>                                             ←—— 1010
       <img src="image/skyex.jpg">
      </td>
      <td align=right>
      <FONT color=#0000a0 size=+1> User Profile -- </FONT>
      </td>
                                                                 ←—— 1015
      <td align=right>
      <FONT color=#0000a0 size=+1> U S Weather </FONT>
...
    </table>

...
    </body>
</html>
```

1105
(color scheme: R:G:B = 204:204:204, range from 0 to 255)

SYSTEM AND METHOD FOR SOURCE-DRIVEN FORM-INDEPENDENT DYNAMIC CONTENT RESOLUTION

FIELD OF THE INVENTION

This invention relates to the field of source-driven form-independent dynamic content resolution over a network for the use of practicing a business method over a network.

BACKGROUND OF THE INVENTION

The explosion of the Internet and the World Wide Web has ushered in an era of unprecedented integration of technology and people. A resounding "yes" to the question of "are you connected" reflects the ubiquitous permeation of the online experience round the globe. Grandparents can now monitor their grandchildren continents apart over the Internet. Individuals to governments to industrial conglomerates all tap into a supply chain infrastructure wrapped around the world many times over, all glued together through Internet technology.

A chain reaction from this explosion is a parallel boom in the head-numbing choices in Internet-related devices and applications people have access to, everything from digital computers to hand-held devices to wearable computing to things that think (Things That Think Consortium headed by Massachusetts Institute of Technology Media Lab) and their related applications.

The concept of separation of content from form has become the defacto standard solution in Internet technology to the challenge of enabling the exchange of information over the Internet through this multitude of devices and applications. Related to interfaces, form means the "look and feel" of an interface while content means the data delivered through the "look and feel". The online dictionary at www.m-w.com defines form as, "the shape and structure of something as distinguished from its material", or "the essential nature of a thing as distinguished from its matter." The "material" and "matter" refer to the content. Not long ago Mosaic was the only graphic user interface to the Internet, and static HTML pages represented the sole source which delivers both the form and the content to users through a graphic user interface over the Internet.

No longer do graphic designers need to understand database API and vice versa, at least in principle. The separation and componentization of, and therefore the efficient utilization of non-overlapping expertise are what separating content and form intends to bring.

STATEMENT OF PROBLEMS WITH THE PRIOR ART

While the concept of separation of content and form is a valid one, in reality, content and form cannot stay separate forever; they have to be integrated eventually in a unified presentation. Here lies the new challenge: on one hand, separation of content and form has led to an exponential growth in the fields of both content and form generation now that the content experts such as database programmers and the form experts such as the graphic designers can work separately of each other without learning each other's skills; on the other, it has given birth to a daunting challenge of putting content and form back together, a vacuum over which neither the content nor the form experts claim responsibility. This vacuum has to be filled because at the end you can separate content and form as much as you want, but neither can stand on its own.

Many approaches to this new paradox include standardization which forces both the content and form created to conform to an agreed-upon set of rules and specification for integration. Recent flourishing of markup languages such as XML and the rest of the alphabet soup is an example of this trend. In this approach, both the content and form experts need to understand the standard and conform to it, added labor which did not exist before and which restricts freedom and flexibility of their respective work. Often in these standards, form dominates content in reality, while in concept content has a greater degree of flexibility than form. After all, a name, the content, can be delivered virtually anywhere, but the form, whether it be visual, audio, digital, vocal, etc., through which it is delivered is often severely limited by circumstances.

Another approach is to surrender control to a third-party application such as plug-ins which handles its own content and form processing. Netscape plug-ins are a well-known example. Recently, Microsoft has announced that it will pull the plug on its support of plug-ins, leaving ActiveX controls, the Microsoft-equivalent of plug-ins the only choice for its Internet Explorer shipped with Windows XP. In essence, plug-ins, ActiveX controls and the like offer a bypass of the separation of content and form altogether, not a solution.

Further efforts now go into dynamic content generation. Examples include U.S. Pat. No. 5,835,712, Client-server system using embedded hypertext tags for application and database development, U.S. Pat. No. 6,256,032, Method and apparatus for organizing and processing information using a digital computer, U.S. Pat. No. 5,940,834, Automatic web page generator, and U.S. Pat. No. 5,983,227, Dynamic page generator.

These efforts are rooted behind the thinking that the generation of content, new content which did not exist prior to these efforts is necessary, therefore they focus on coming up with novel approaches to generate the new content. In the process, these efforts blur the line differentiating content from form, force content and form to conform specifications of a particular approach, and/or generate new content specifically for a particular approach, thus defeating the key purposes behind the separation of content and form: 1. Form experts and content experts could work separately without learning each other's skills. 2. Form and content thus created are reusable for different presentations based on different approaches.

On the other hand, this patent is based on a simple but different philosophy, that of dynamic integration of content and form, which at the end aims for a unified presentation of both, but requires nothing more than the placements of previously created content and form with no new content being generated specifically for this approach. This approach emphasizes the separation of content and form by maintaining control over the placement decision of form and content in a unified presentation and yet allowing separate requirements on content and form to drive that decision, for example on how they are to be accessed, retrieved and inserted separately based on their own requirements.

OBJECTS OF THE INVENTION

An object of this invention is an improved business method for source-driven form-independent dynamic content resolution over a network.

An object of this invention is an improved business method for insert statement parsing for use in source-driven form-independent dynamic content resolution over a network.

An object of this invention is an improved business method for content source identification for use in source-driven form-independent dynamic content resolution over a network.

An object of this invention is an improved business method for content source access for use in source-driven form-independent dynamic content resolution over a network.

An object of this invention is an improved business method for content insertion for use in source-driven form-independent dynamic content resolution over a network.

SUMMARY OF THE INVENTION

The present invention is a computer system and method for dynamic content resolution. The invention comprises one or more source program files and one or more insert statements inserted into the source program files. The insert statements having one or more logical condition statements with one or more logical parameters and one or more state statements. An insert statement parser determines a state of the condition statement, selects one of the state statements associated with the state, and parses the selected state statement into one or more content source indicators. A content source identification process uses one or more of the content source indicators to determine a content source type and one or more access instructions. A content source access process uses the access instructions to access a source object. A content insertion process replaces the insert statement with the source object in the source program file.

BRIEF DESCRIPTION OF THE DRAWINGS

The foregoing and other objects, aspects and advantages will be better understood from the following detailed description of preferred embodiments of the invention with reference to the drawings that include the following:

FIG. 3 is a block diagram of a content source access map.

FIG. 4 is a block diagram of the insert statement parser rules.

FIG. 9 is an example HTML program source file.

FIG. 10 is the resolved source of the example HTML program source file.

DETAILED DESCRIPTION OF THE INVENTION

Figure 1:
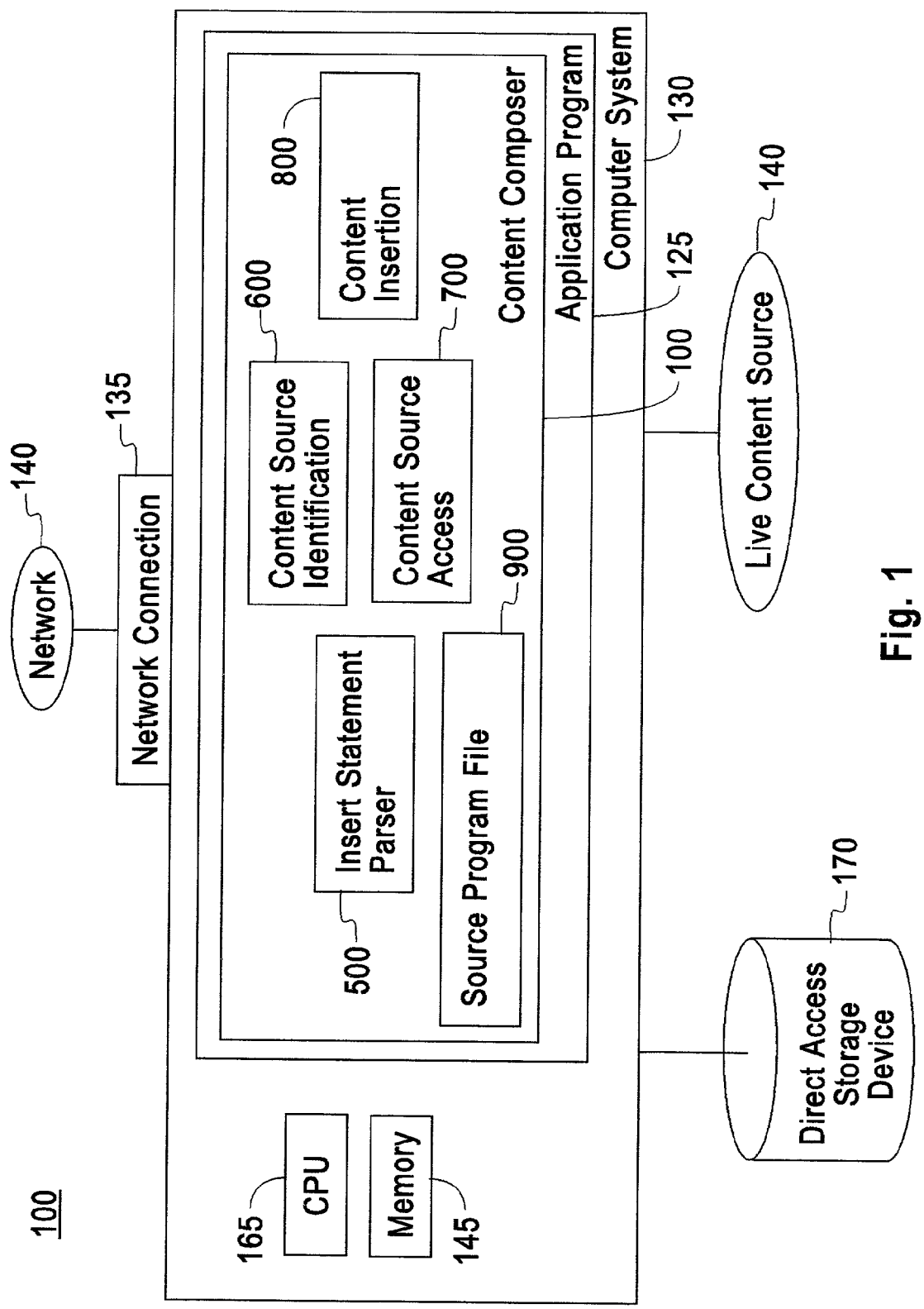
FIG. 1 is a block diagram of a source driven form-independent dynamic content resolution system also known as a content composor.

FIG. 1 is a block diagram of a source driven form-independent dynamic content resolution system, also known as a content composer 100. FIG. 1 contains a computer system 130, which is connected to a network 140 through a network connection 135, Direct Access Storage Devices (DASD) 170, and Live Content Sources 140. Live Content Sources 140 could include temperature or weight sensors, electronic instruments, microphones, video cameras, still digital cameras, etc.

The computer system 130 contains one or more Central Processing Units (CPUs) 165 and one or more Memories 145. The computer system 130 is running an application program 125, which contains the content composor 100. The content composor 100 accesses one or more memories 145.

Figure 5:
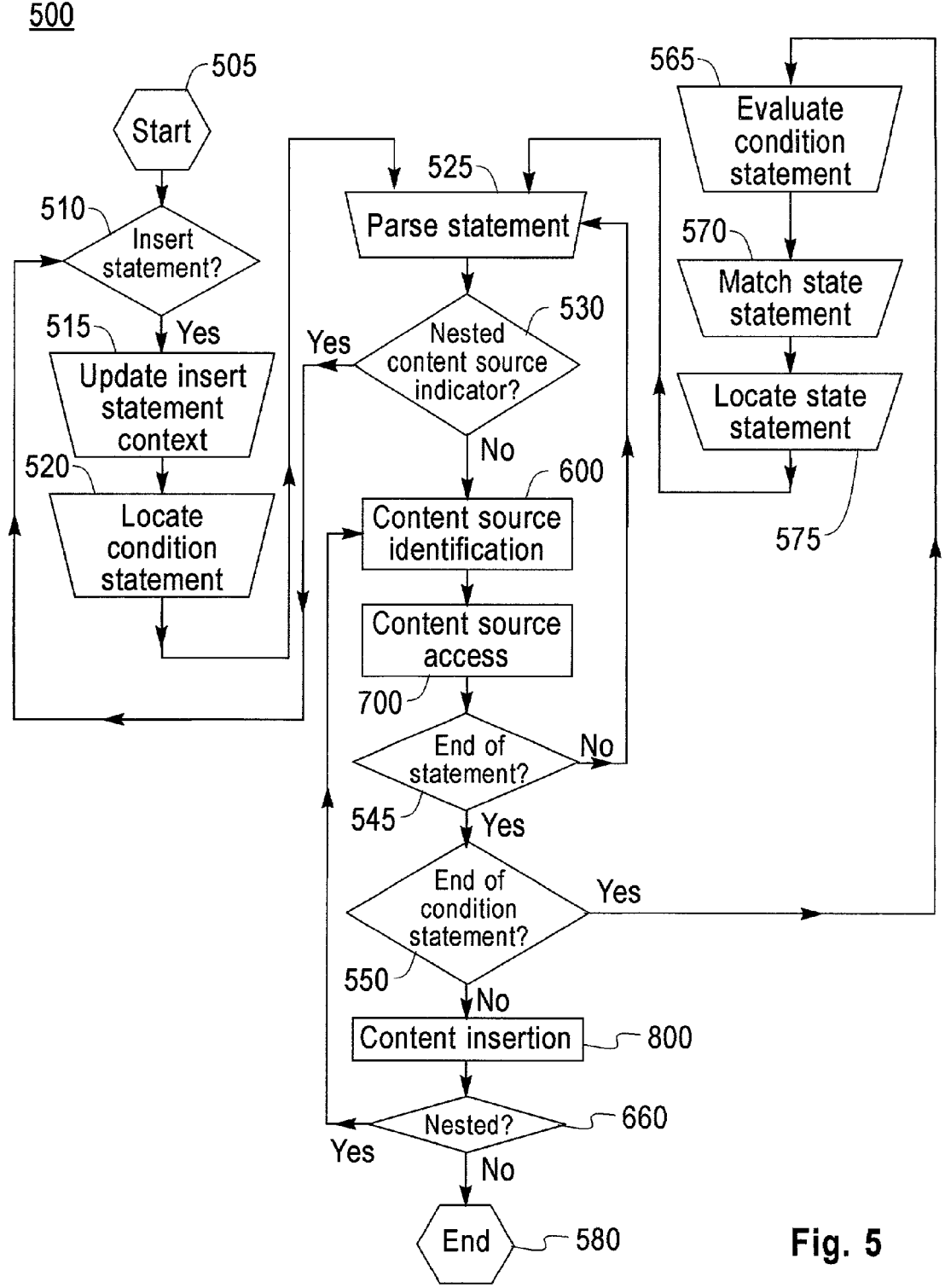
FIG. 5 is a flow chart of the insert statement parser process.
Figure 6:
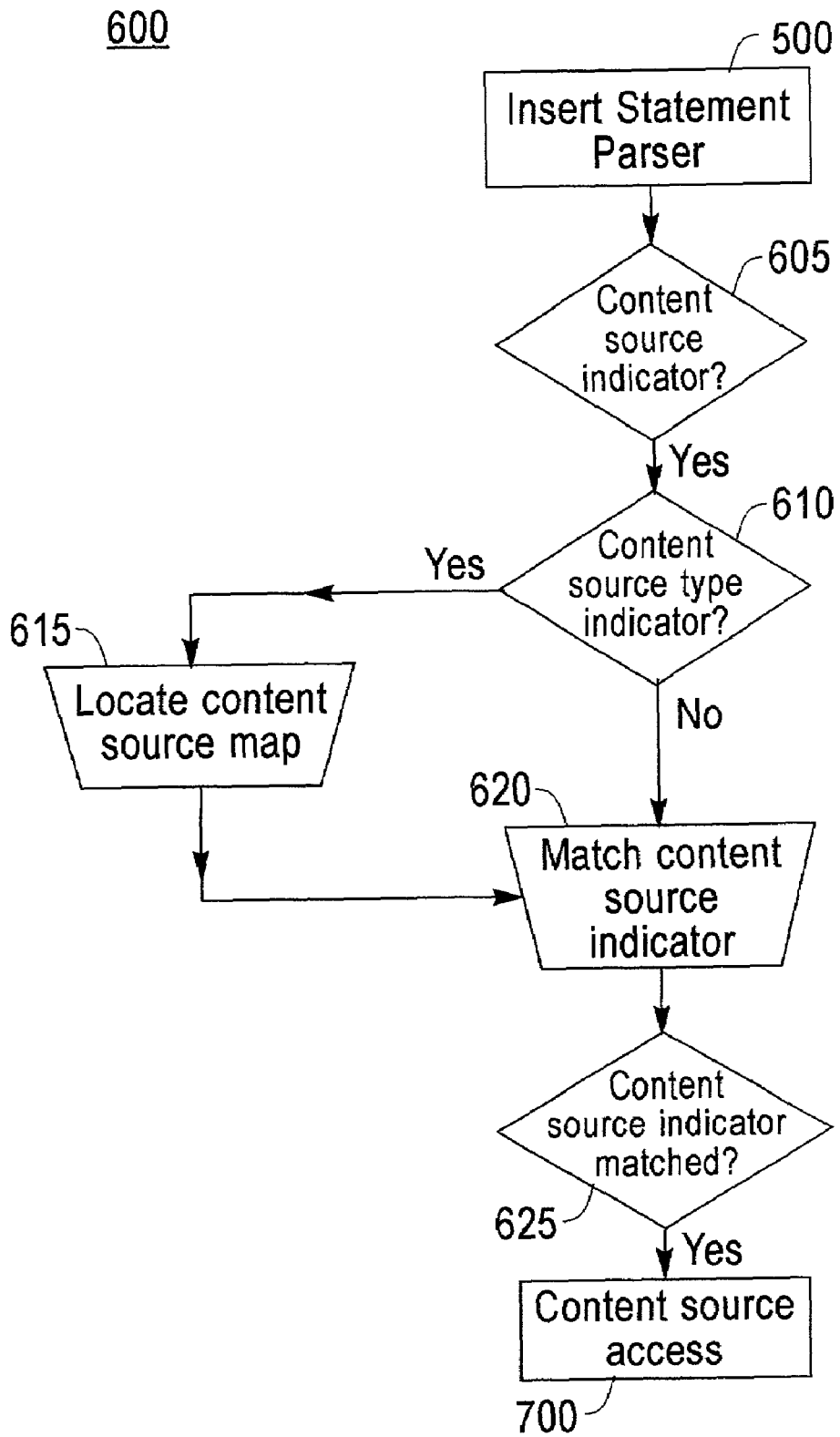
FIG. 6 is a flow chart of the content source identification process.
Figure 7:
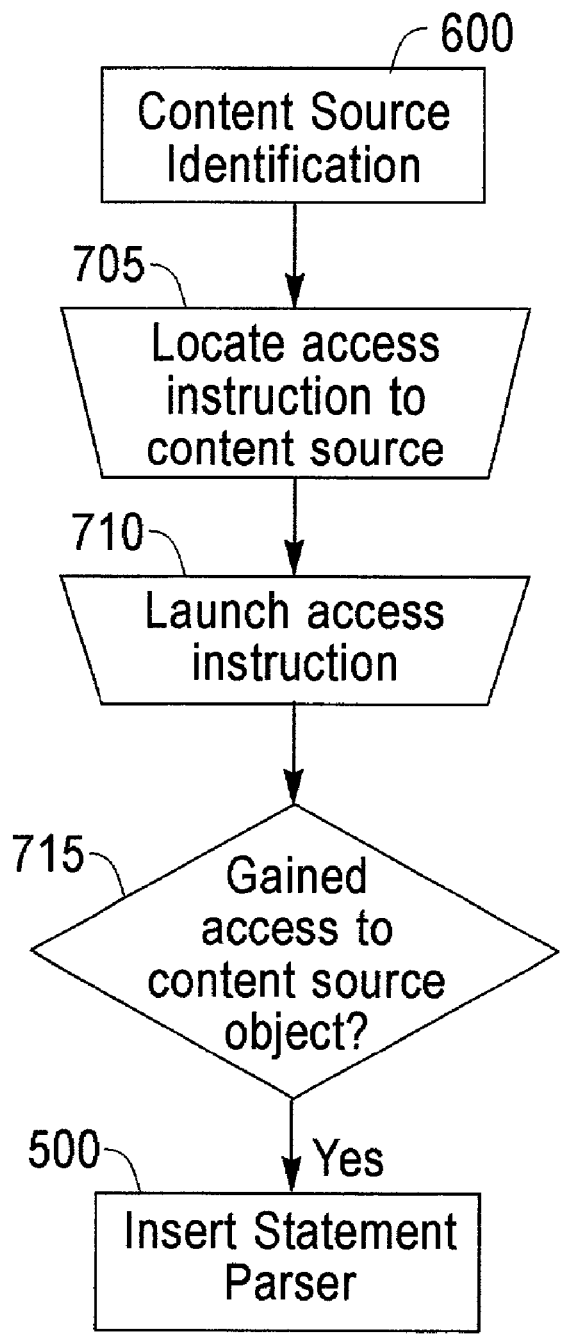
FIG. 7 is a flow chart of the content source access process.
Figure 8:
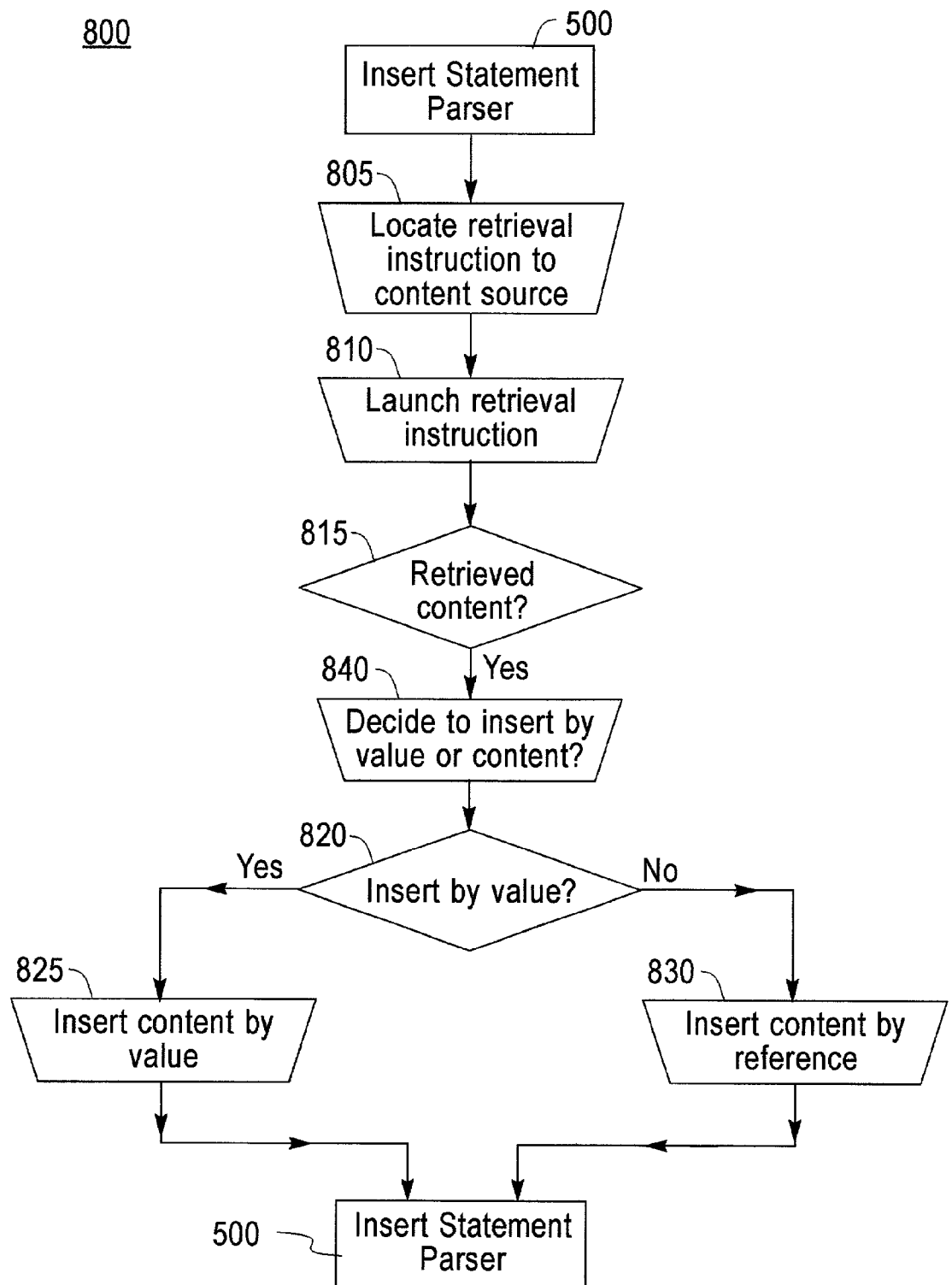
FIG. 8 is a flow chart of the content insertion process.

The content composor 100 contains four processes: an insert statement parser process 500 further described in FIG. 5, a content source identification process 600 further described in FIG. 6, a content source access process 700 further described in FIG. 7, and a content insertion process 800 further described in FIG. 8.

Figure 11:
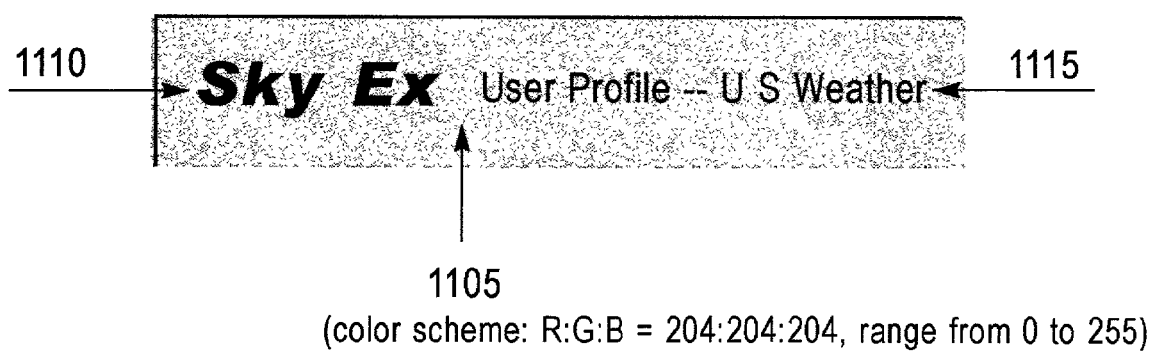
FIG. 11 is a rendering of the resolved source of the example HTML program source file.

A source program file 900 is an input to the insert statement parser process 500. A source program file contains form information, which is defined in the background of this invention, and novel insert statements 205 further described in FIG. 2. FIG. 9 further describes an example source program file 900 referred to as HTML source program file, which contains Hypertext Markup Language (HTML) scripts and optionally insert statements 205. In FIG. 9, form information refers to instructions conforming to HTML syntax on how to render specific forms such as table, column, font, color, size, etc. FIG. 10 further describes the resolved HTML source, i.e. with the insert statement 205 being replaced by content, of the example HTML source program file in FIG. 9. FIG. 11 further describes the graphic rendering of that resolved HTML source in FIG. 10.

Figure 2:
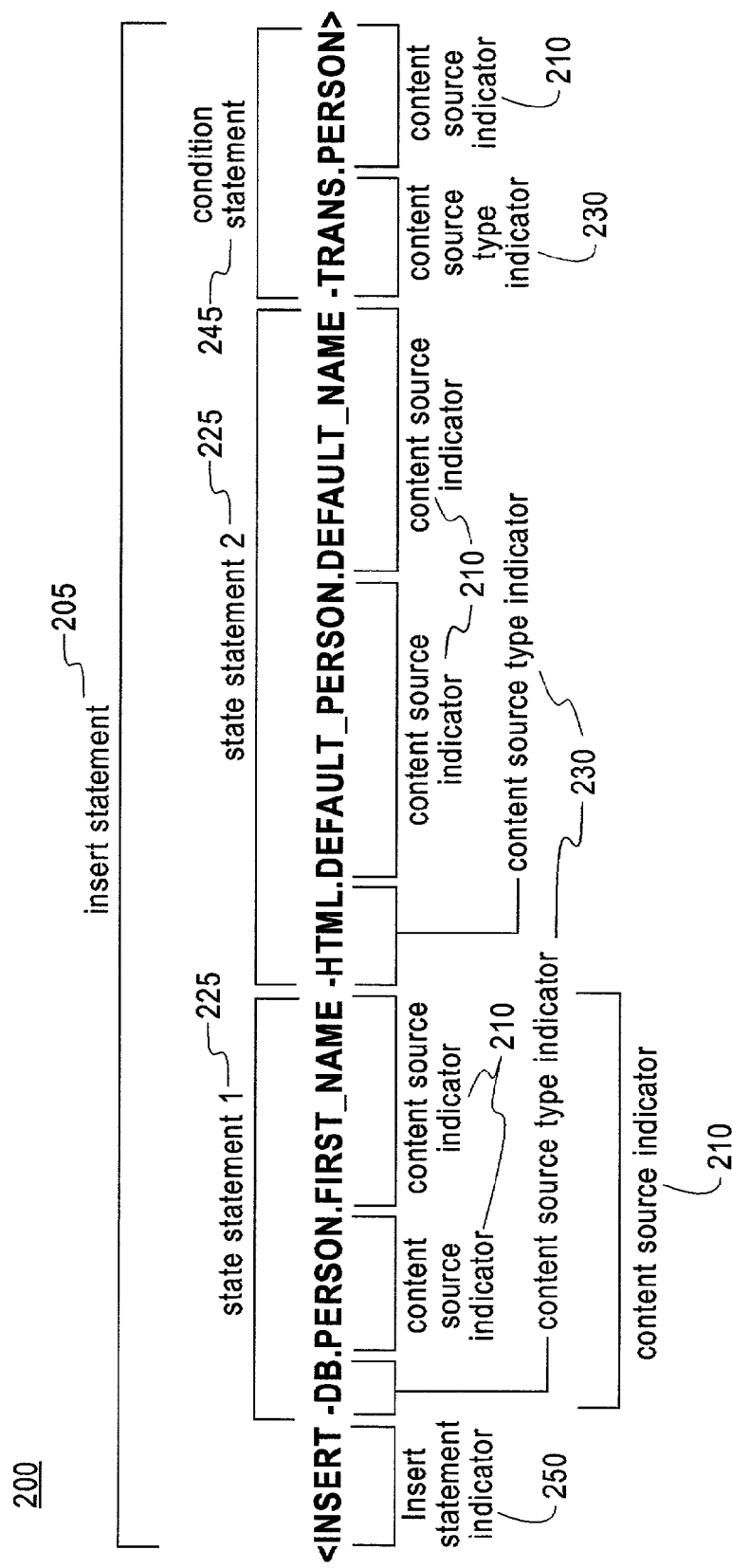
FIG. 2 is a block diagram of an example insert statement.

The insert statement parser process 500 starts by locating insert statements 205 within a source program file 900. The structure of an insert statement 205 is further described in FIG. 2, an insert statements structure block diagram 200. The insert statement parser process 500 then parses the insert statement 205 into its components, namely one or more content source indicators 210. The insert statement parser rules 400 are further described in FIG. 4. The one or more content source indicators 210, which are further described in FIG. 2, are arranged hierarchically into one or more state statements 225 and one or more condition statements 245. As an alternative, one or more additional insert statement 205 could also be nested within a content source indicator 210 and is further described in FIG. 2A.

Once a content source indicator 210 is parsed, the content source identification process 600 then takes the content source indicator 210 as input and identifies the content source object 305 it represents through the use of a content source access map 300, which is further described in FIG. 3. A content source object 305 is one or more of the following: a mass data storage application, an HTML program source file, a static file, a memory access, a multimedia data file, text file, XML file, binary data file, remote file, and live content Examples of live content include data from live content source objects 305 such as temperature or weight sensors, electronic instruments, microphones, video cameras, still digital cameras, etc.

Once a content source object 305 is identified, the content source access process 700 locates its associated access instructions and then accesses it. Finally if access is successful, the content insertion process 800 retrieves the content from the content source object 305 and inserts it in place of the insert statement 205, either by reference or value.

FIG. 2 is a block diagram of an example insert statement 205. The following shall describe the example insert statement 205 from left to right starting with the keyword, INSERT. INSERT is the insert statement indicator 250, which indicates the start of an insert statement 205 to the insert statement parser process 500. The open and close brackets before INSERT and at the end of the insert statement, along with the hyphens, periods and spaces are part of the preferred rules 400 with which the insert statement parser process 500 parses the insert statement 205. FIG. 4 further describes these preferred rules 400.

Following INSERT are two state statements 225, state statement 1 (225) and state statement 2 (225). Each state statement 225 has one or more content source indicators 210 and the content source indicators 210 are in a hierarchy of indicators. The state statements 225 is this example contain two or three content source indicators 210. One of the content source indicators 210 of each state statement 225 is a content source type indicator 230. A content source type indicator 230 is a content source indicator 210 which further indicates the type of a source object 305.

In this example, state statement 1 (225) contains the keywords, DB, PERSON and FIRST_NAME respectively from left to right. Each keyword is a content source indicator 210. In this example, DB, the first content source indicator 210 from left in state statement 1 (225), is a content source type indicator 230, associated with a content source object 305, mass data storage application or a database application more specifically. The hierarchy of content source indicators 210 of, from left to right in state statement 1 (225), DB, PERSON and FIRST_NAME is associated with a content source object 305, its content source type, its location as well as location of its content access and retrieval instructions.

Similarly, state statement 2 (225) contains the keywords, HTML, DEFAULT_PERSON, and DEFAULT_NAME respectively from left to right, each a content source indicator 210. In this example, HTML, the first content source indicator 210 from left in state statement 1 (225) is a content source type indicator 230, associated with a content source object 305, an HTML source program file in this case. FIG. 3 further describes the hierarchy of content source indicators 210 in each of the state 225 and condition statements 245 and the association to its content source object 305.

Following the two state statements 225 in this example is one logical condition statement 245. This logical condition statement 245 contains the keywords, TRANS and PERSON respectively from left to right, each content source indicator 210. In this example, TRANS, the first content source indicator 210 from left in this logical condition statement 245, is a content source type indicator 230. In the preferred embodiment, TRANS refers to memory 145 which contains context 515 information for the content composor 100. FIG. 3 further describes the hierarchy of content source indicators 210 in each of the state 225 and condition statements 245 and the association to its content source object 305.

Notice that none of the content source indicators 210 in FIG. 2 described above is nested. The following shall describe a nested content source indicator 210.

Figure 2A:
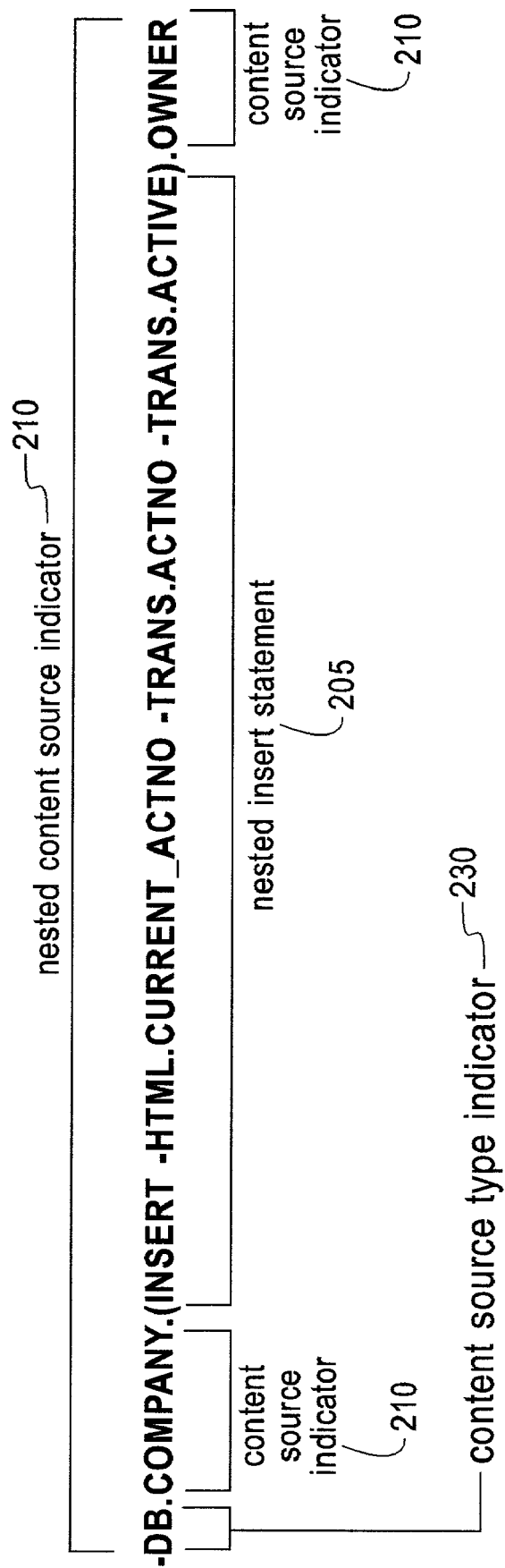
FIG. 2A is block diagram of a nested content source indicator.

FIG. 2A is block diagram of a nested content source indicator 210. In the preferred embodiment, the nested content source indicator 210 could be from a hierarchy of content source indicators 210, which could be from a state 225 or a logical condition statement 245 within an insert statement 205.

Starting from left to right, following the keywords DB and COMPANY and before OWNER is an insert statement 205 contained between a pair of parantheses. The pair of parentheses is the preferred nested content source indicator identifier 425 which indicates the existence of a nested content source indicator 210. In this example, the pair of parentheses is part of the preferred rules followed the insert statement parser process 500 further described in FIG. 5.

The nested insert statement 205 in this example, starting with the keyword INSERT, contains two state statements 225, and one logical condition statement 245. State statement 1 (225) contains keywords HTML and CURRENT_ACTNO from left to right, each a content source indicator 210 with HTML being a content source type indicator 230. Similarly, state statement 2 (225) contains keywords TRANS and ACTNO from left to right, each a content source indicator 210 with TRANS being a content source type indicator 230. The logical condition statement 245 contains keywords TRANS and ACTIVE from left to right, each a content source indicator 210 with TRANS being a content source type indicator 230. The description above on the structure of an insert statement in FIG. 2 applies here.

The insert statement parser process 500, the content source identification process 600, the content source access process 700 and the content insertion process 800 then process and resolve this nested insert statement 205, the structure of which is described in FIG. 2. As an example, resolving the nested content source indicator could yield

-DB.COMPANY.A454.OWNER, with A454 replacing the nested insert statement,

INSERT -HTML.CURRENT_ACTNO -TRANS.ACTNO -TRANS.ACTIVE

Notice that none of the content source indicators 210 of the nested insert statement 205 in this example is nested. Otherwise, the description above on the nested content source indicator 210 applies recursively until none of the content source indicators 210 of an insert statement 205 is nested. Each nested insert statement 205 would then be resolved and replaced by content from a content source object 305. A path refers to the recursive calls processing the nested insert statements.

FIG. 3 is a block diagram of an example content source access map 300. A content source access map 300 is a table which associates hierarchies of content source indicators 210 with content source objects 305 and content source object information 310. The content source object information 310 includes content source type information, optional location information and optional content access and retrieval instruction location information.

The content source indicators 210 column of the content source access map 300 contains a hierarchy of content source indicator 210 keywords, such as DB, PERSON and FIRST_NAME in the first cell from the top of the middle column, each keyword a content source indicator 210. The first row of the example content source access map 300 contains the keywords DB, PERSON and FIRST_NAME. These keywords correspond to the keywords of state statement 1 (225) in FIG. 2.

The content source objects 305 column contains cells grouped from top to bottom, corresponding to cells in the middle column. Each cell contains a content source object 305 associated with the hierarchy of content source indicators in the corresponding cell of the middle column. From top to bottom, these content source objects 305 include mass data storage application, HTML program source file, static file, memory access and multimedia data file.

The content source object information 310 column contains cells grouped from top to bottom, corresponding to cells in the middle column. Each cell contains information on a content source object 305 associated with the hierarchy of content source indicators 210 in its corresponding cell in the middle column. The information on a content source object 305 includes its content source type, its location as well as location of its content access and retrieval instructions 310. Notice that the information 310 is grouped hierarchically in parallel to the hierarchy of content source indicators 210.

Take the first cell for example, DLL SXDB OPENFN contains the access instruction to the mass data storage application referred to by the content source indicator 210, DB. DLL indicates the type of the access instruction which is Dynamically Linked Library (DLL) in this case. SXDB indicates the location where the access instruction is at. SXDB is a library file which is compiled and linked from source codes written in the computer language C. OPENFN indicates the function within SXDB to be called in order to gain access to the mass data storage application. The execution details such as compiling and linking of the source codes written in C are well understood as prior arts.

The following line, DLL SXDB_PERSON SXDBFIND-PERSON contains the access instruction to the person table within the mass data storage application. PERSON is the content source indicator referring to the person table. Finally, DLL SXDB_PERSON SXDBQUERYFNFORPERSON contains the access instruction to the first name entry within the person table within the mass data storage application. FIRST_NAME is the content source indicator referring to the first name entry. Notice that the hierarchy of the content source indicators corresponds to the hierarchy of the access instructions and the data structure within the mass data storage application.

FIG. 4 is a block diagram of the preferred insert statement parser rules 400 used by insert statement parser process 500 to parse an insert statement 205 into content source indicators 210. The left column contains keywords for the rules, and the right column contains the corresponding indicators of these rules used in an insert statement 205. The following describes the rules one row at a time from top to bottom.

Insert statement identifiers 402 are "<" to indicate the possible start of an insert statement and ">" to indicate the corresponding end of the insert statement. Next, order of parsing 405 refers to the order with which the insert statement parser process 500 parses an insert statement 205. In the case of a nested content source indicator 210, the order of parsing 405 applies to subsequent nested insert statements 205. In this preferred embodiment, parsing of nested insert statements takes place after the parsing of the insert statement containing it. The order of parsing 405 applies when there are more than one nested insert statement 205 within the content source indicator 210 of one insert statement 205. The blank character, or " ", is the preferred statement delimiter 415 which separates each state and condition statement. The hyphen character, or "–", is the preferred content source type indicator identifier 420 which identifies a content source type indicator 230 from content source indicators 210. In the examples, a content source type indicator 230 is the first content source indicator 210 of a state 225 or condition statement 245. The opening and closing parenthsis, or "(" and ")", is the preferred nested content source indicator identifier which identifies the beginning and end of a nested insert statement 205 respectively.

FIG. 5 is an insert statement parser process flow chart 500 with start 505 and end 580 indicating the start and end of the process respectively. The process start is continued by a check for insert statement 510 within a source program file 900. FIG. 2 further describes an insert statement 205. In this preferred embodiment, confirming the existence of an insert statement leads to an update of the insert statement context 515. Otherwise, a no to the check for insert statement 510 leads to an exit from the insert statement parser process 500. Throughout this patent, a no to a conditional check is not explicitly marked in the diagrams and/or described in the writeup, then it leads to an exit from the insert statement parser process 500. Examples of this case include the conditional check on content source indicator 605, the conditional check on matched content source indicator 625, etc. The location of the updating of an insert statement context 515 can be anywhere between the start 500 and end 580.

An insert statement context 515 is stored in memory 145 and contains information which the insert statement parser process needs in order to continue its proper execution. For example, in the case of processing nested insert statements 205, the insert statement context 515 contains information on the recursive path such as a nested counter which keeps track of which layer of nested insert statement 205 is being processed, and the location of a nested insert statement 205 in the content source indicator 210 which contains it, etc.

Then the process continues by locating a logical condition statement 520, and parsing that statement 525. Notice that both a logical condition statement 245 and a state statement 225 could be parsed. Yielding a content source indicator leads to a check whether it is a nested content source indicator 530. The following describes first the subsequent steps when the content source indicator 210 is not a nested one, and then the steps when the content source indicator 210 is a nested one.

When a content source indicator 210 is not a nested one, it is inputted into the content source identification process 600, which identifies the content source object 305 to which the content source indicator 210 is associated. FIG. 6 further describes the content source identification process 600.

Once the content source object 305 is identified, the content source access process 700 follows the content source identification process 600 and accesses the content source object 305, after which there is check for end of that statement 545, whether it be a logical condition statement or a state statement. If it is not the end of that statement, then the insert statement parser process 500 continues with parsing the remaining statement 525. Otherwise, it continues with a check for an end of a logical condition statement 550. An end of a logical condition statement 245 leads to the evaluation of the logical condition statement 565. The preferred embodiment contains a binary evaluation and matching to the appropriate state statement 570, state one corresponding to the having access to the last content source indicator 210 of the logical condition statement 245, and state two corresponding to not having access to the last content source indicator 210. When multi-state evaluation is necessary, the preferred embodiment can be extended to contain an additional equality test on the content source object 305 through access the last content source indicator 210. Then the insert statement parser process 500 continues with locating 575 and parsing of the matched state statement 525.

On the other hand, not an end of a logical condition statement indicates the end of a state statement 225, and leads to the content insertion process 800. The content insertion process 800 retrieves the content from the content source object 305 accessed by the content access process 700, and inserts either the content or a reference to the content in place of where the evaluated insert statement 205 is in the program source file 900. FIG. 8 further describes the content insertion process 800.

Because the above description, as mentioned earlier, is on a content source indicator 210 which is not nested, the subsequent check on the content source indicator 210 being a nested one leads to the end 580. Notice that the end 580 could indicate either the end of the insert statement parser process 500, or end of parsing the nested insert statement 205, but not the end of the insert statement parser process 500. The following description on nested content source indicator 210 shall further justify the latter case.

Now consider the process when the check for nested content source indicator 530 indicates a nested one 210. The process performs a recursive call to the start 505 of the insert statement parser process, and proceeds again to the check for nested content source indicator 530. These steps cycle through until a content source indicator 210 checked is not a nested one, at which moment, the steps described for a non-nested content source indicator 210 above follow.

Notice that the subsequent updates on insert statement context 515, as in the case when there are nested content source indicators 210, would store in memory 145 information on the path from the preceding insert statement 205 to the steps involving the current insert statement 205 are recursively called from, as to be able to return the processing of the preceding one when the current one is processed. The logic behind the iteration and the corresponding access to CPU 165 and memory 145 are similar to that of a simple interactive program and the behavior of the stack and first-in-first-out queue.

To conclude, the interactive process of decomposing a nested content source indicator 210 to non-nested content source indicators 210 ends with the logical condition statement 245 and its corresponding state statement 225 of an insert statement 205 containing all non-nested content source indicators 210.

FIG. 6 is a content source identification process flow chart 600. Once the insert statement parser process 500 determines a content source indicator 210 to be non-nested, the content source identification process 600 starts. First, it verifies whether it is indeed a content source indicator 605. Notice that this is a different check than that on whether a content source indicator 210 is nested because the latter focuses on the "nestedness". Then it further checks 610 whether a content source indicator is a content source type indicator 230.

In the case of a content source type indicator 210, the next step is to locate the content source access map 615. In the case of not a content source type indicator 210, the next step is to match the content source indicator 620 to the appropriate access instructions in the content source access map 615. If the content source indicator is matched 625, it's then onto the content source access process 700.

FIG. 7 is a content source access process flow chart 700. The matched content source indicator 210 then leads to locating the access instruction to the content source object 705. Launching of the access instruction 710 then follows. Once gained access to the content source object 715, the flow of control goes back to the insert statement parser process 500.

FIG. 8 is a content insertion process flow chart 800. Continuing from FIG. 7, once the end of a state statement 245 is reached, the content insertion process 800 starts. It locates the content retrieval instruction to the content source object 805. Then it launches the retrieval instruction 810. Once content is retrieved 815, deciding to insert by value or reference 840 leads to either insert content by value 825 or by reference 830. Then the flow of control goes back to the insert statement parser process 500.

Deciding to insert content by value or reference 840 depends on many criteria. The type of a program source file is one preferred criterion. The type HTML of the example program source file 900 in FIG. 9 is a criteria to deciding to insert by value or reference 840 on the insert statement, <INSERT -IMAGE.SKYEXBACKIMG -IMAGE.DE-FAULTBACKIMG -TRANS.SKYEX> 905, which leads to inserting content by reference 830, specifically inserting a reference of the background image, back18.jpg 1005 as described in FIG. 10.

Additional preferred criteria include the size of the content to be inserted, network bandwidth, occurrence rate of content within a program source file, update rate of the content within its content source object. The criteria could take the forms of threshold tests as follows:

Size: 1 Kilobits

The larger the size of the content, the more processing it takes to insert it by value relative to insert it by reference. The above criteria means that a content size below the threshold of 1 Kilobits goes into deciding for inserting by value, and for inserting by reference otherwise.

Network bandwidth: 1 Megabits per second

There are cases when content to be inserted is transmitted over a network 140. The above criteria means that a network bandwidth above the threshold of 1 Megabits per second goes into deciding for inserting by value, and for inserting by reference otherwise.

Occurrence rate: 10 times per program source file 10 insertions by reference could be associated with 1 copy of the content in the best scenario, while 10 insertions by value would lead to 10 copies of the content. The above criterion means that a content occurrence rate of 10 times or more per program source file goes into deciding for inserting by reference, and for inserting by value otherwise.

Update rate: 100 times per second

The higher the update rate, the more prone it is for corrupted or obsolete content which is inserted by value. The above criteria means that an update rate of 100 times or more per second to the content within its content source object goes into deciding for inserting by reference, and for inserting by value otherwise.

In the preferred embodiment, additional numerical weights are assigned to each criterion. Weights range from a preferred range of −10 to 10, with the negative range going into deciding for inserting by reference, and the positive range going into deciding for inserting by value. The greater the absolute value of a number, the greater the weight of that criterion in deciding to insert by value or reference 840. In addition, insertion by reference leads to different content depending on the type of a source program file. The example in FIG. 9 illustrates this case.

FIG. 9 is an example HTML source program file 900. In the example of an HTML source program file 900 included in this figure, three insert statements 205 highlighted in boldface and italic are embedded within regular HTML source. -TRANS.SKYEX is the logical condition statement 245 for the first insert statement, <INSERT -BK_IMAGE.SKYEXBACKIMG -BK_IMAGE.DEFAULT-BACKIMG -TRANS.SKYEX> 905, and second insert statement, <INSERT -IMAGE.SKYEXLOGO -MAGE.DE-FAULTBACKIMG -TRANS.SKYEX> 910.

In a preferred processing of this example, this logical condition statement evaluates to true, therefore, an HTML reference to a background image for skyex 1005 is inserted as a result of evaluating the first insert statement 905, and an HTML reference to a skyex logo image 1010 is inserted as a result of evaluating the second insert statement 910. Notice that because the source program file is of type HTML, the HTML reference to the background image, background="image/back18.jpg" 1005 conforms to the HTML syntax by containing the word, background. It also specifies the path to the file, "image/back18.jpg" properly for HTML rendering of it. Similarly, the HTML reference to the logo image, <img src="image/skyex.jpg"> 1010 conforms to the HTML syntax for rendering an image by containing the word, <img src=. For source program files of other types, a reference of skyex.jpg could be sufficient.

-TRANS.USERCLAIMED is the logical condition statement for the third insert statement, <INSERT -TRANS.PERSON.COMPANY_NAME -HTML.DEFAULT_COMPANY_NAME -TRANS.USERIDCLAIMED> 915, and is evaluated true in a preferred processing of the example, therefore, -TRANS.PERSON.COMPANY_NAME is evaluated and a company name, U.S. Weather 1015, is inserted.

FIG. 10 describes the HTML source after the three insert statements are resolved. FIG. 11 describes the graphic rendering of the HTML source in FIG. 10.

FIG. 10 is an example rendering of an HTML source program file.

Following the above description for FIG. 9, the first insert statement is resolved to back18.jpg 1005. The second insert statement is resolved to skyex.jpg 1010. The third insert statement is resolved to U.S. Weather 1015.

FIG. 11 is the resolved source of rendering of an example HTML program source file. Following the above descriptions for FIGS. 9 and 10, the HTML rendering of <body background="image/back18.jpg"> 1005 results in the background color 1105 of the rendered image in this figure. The HTML rendering of <body background="image/back18.jpg"> 1010 results in the logo 1110 located to the left of the rendered image. The third insert statement is resolved to US Weather 1015, the HTML rendering of which is US Weather 1115, which is located to the right of the skyex logo.

We claim:

1. A system for dynamic content resolution comprising:
   one or more central processing units (CPUs) and one or more memories;
   one or more source program files;
   one or more insert statements inserted into the source program file, the insert statement comprising at least one logical condition statement containing at least one content source indicator and at least one state statement containing at least one content source indicator;
   an insert statement parser that determines a state of the at least one logical condition statement, selects the at least one state statement associated with the state of the at least one logical condition statement, and parses the selected state statement into one or more content source indicators;
   a content source identification process that determines content source types and one or more access instructions from the one or more of the content source indicators;
   a content source access process that accesses from the access instructions a content source object having content; and
   a content insertion process that replaces the insert statement with the content accessed from the content source object referred to by the one or more content source indicators in the source program file.

2. A system, as in claim 1, where the content insertion process replaces the insert statement in one of the following ways: a replacement by value and a replacement by reference.

3. A system, as in claim 1, further comprising a decision process that decides how the content insertion process replaces the insert statement.

4. A system, as in claim 3, where the decision process decides to replace the insert statement by one of the following: a replacement by value and a replacement by reference.

5. A system, as in claim 1, where the state statement has at least two content source indicators and the content source indicators are in a hierarchy of indicators.

6. A system, as in claim 5, where the content source access process recursively traverses the hierarchy of indicators to obtain a set of access instructions at one or more levels of the hierarchy of indicators.

7. A system, as in claim 1, where the content source object is any one or more of the following: a mass data storage application, an HTML program source file, a static file, a memory access, a multimedia data file, text file, XML file, binary data file, remote file, electronic measurement and live content.

8. A system, as in claim 1, where one of the content source indicators is a content source type indicator.

9. A system, as in claim 8, where the content source object is a mass data storage application and the content source type indicator has a location of the data storage application and the content source type, respectively.

10. A system, as in claim 8, where the content source object is an HTML source program file and the content source type indicator is a keyword that indicates the content source type as an HTML type, the content source type being associated with a location of the access instructions for the HTML source program file.

11. A system, as in claim 1, where the content source object is a static file and the content source type indicator is a location of the access instructions.

12. A system, as in claim 1, where the logical condition statement is one or more content source indicators.

13. A system, as in claim 1, where the source program file contains one or more insert statements and the content.

14. A system for dynamic content resolution comprising:
    one or more central processing units (CPUs) and one or more memories
    one or more source program files;
    one or more insert statements inserted into the source program file, the insert statement having one or more logical condition statements with one or more logical parameters and one or more state statements with one or more content source indicators, where the state statements are nested insert statements;
    an insert statement parser that determines a state of the condition statement, selects one of the state statements associated with the state, parses the selected state statement into the respective content source indicators, and creates an insert statement context that tracks a path connecting the nested insert statements;
    a content source identification process that uses one or more of the content source indicators to determine a content source type and one or more access instructions;
    a content source access process that used the access instructions to access a content source object;
    the content source object having content, and a content insertion process that replaces the insert statement with the content accessed from the content source object referred to by the indicators in the source program file.

15. A system, as in claim 14, where the insert statement parser further attaches context information to the path.

16. A method for dynamic content resolution comprising:
identifying one or more insert statements inserted into a source program file, the insert statement having one or more logical condition statements with one or more logical parameters and one or more state statements;
determining a state of the logical condition statement;
selecting one of the state statements associated with the state of the logical condition statement
parsing the selected state statement into one or more content source indicators;
determining a content source type and one or more access instructions from the one or more of the content source indicators;
accessing from the access instructions a content source object having content; and
replacing the insert statement with the content from the content source object referred to by the one or more content source indicators in the source program file.

17. A system for dynamic content resolution comprising:
one or more central processing units (CPUs) and one or more memories;
means for identifying one or more insert statements inserted into a source program file, the insert statement having one or more logical condition statements with one or more logical parameters and one or more state statements;
means for determining a state of the logical condition statement;
means for selecting one of the state statements associated with the state of the logical condition statement;
means for parsing the selected state statement into one or more content source indicators;
means for determining a content source type and one or more access instructions from the one or more of the content source indicators;
means for accessing from the access instructions a content source object having content; and
means for replacing the insert statement with the content from the content source object referred to by the indicators in the source program file.

18. A computer program product having a computer program stored on a computer readable medium comprising:
code for identifying one or more insert statements inserted into a source program file, the insert statement having one or more logical condition statements with one or more logical parameters and one or more state statements;
code for determining a state of the logical condition statement;
code for selecting one of the state statements associated with the state of the logical condition statement;
code for parsing the selected state statement into one or more content source indicators;
code for determining a content source type and one or more access instructions from one or more of the content source indicators;
code for accessing from the access instructions a content source object having content; and
code for replacing the insert statement with the content from the content source object referred to by the indicators in the source program file.

19. A system for dynamic content resolution comprising:
one or more central processing units (CPUs) and one or more memories;
one or more source program files;
one or more insert statements inserted into the source program file, the insert statement having one or more logical condition statements with one or more logical parameters and one or more state statements;
an insert statement parser that determines a state of the logical condition statement, selects one of the state statements associated with the state, and parses the selected state statement into one or more content source indicators;
a content source identification process that uses one or more of the content source indicators to determine a content source type and one or more access instructions;
a content source access process that uses the access instructions to access a content source object, the content source object having content; and
a content insertion process that replaces the insert statement with the content accessed from the content source object referred to by the indicators in the source program file, where
the content insertion process replaces the insert statement in one of the following ways: a replacement by value and a replacement by reference, and
the content source object is an HTML source program file and a content source type indicator is a keyword that indicates the content source type as an HTML type, the content source type being associated with a location of the access instructions for the HTML source program file.

* * * * *